United States Patent [19]

Christian et al.

[11] Patent Number: 5,775,795
[45] Date of Patent: Jul. 7, 1998

[54] HEADLIGHT POSITION ADJUSTMENT ASSEMBLY

[75] Inventors: Todd Christian, Wadsworth; Thomas Franz, North Canton, both of Ohio

[73] Assignee: Eaton Corporation, Cleveland, Ohio

[21] Appl. No.: 891,444

[22] Filed: Jul. 10, 1997

[51] Int. Cl.⁶ .................................................. B60Q 1/06
[52] U.S. Cl. ................ 362/66; 362/424; 362/289; 362/422; 362/428
[58] Field of Search .................. 362/61, 66, 422, 362/289, 424, 80, 287, 428

[56] References Cited

U.S. PATENT DOCUMENTS

| | | | |
|---|---|---|---|
| 4,796,494 | 1/1989 | Eckenrode et al. | 81/484 |
| 5,165,775 | 11/1992 | Lisak et al. | 362/66 |
| 5,186,531 | 2/1993 | Ryder et al. | 362/66 |
| 5,309,780 | 5/1994 | Schmitt | 74/89.13 |
| 5,321,590 | 6/1994 | Wu | 362/66 |
| 5,351,170 | 9/1994 | Nagengast et al. | 362/66 |
| 5,365,415 | 11/1994 | Schmitt et al. | 362/66 |

*Primary Examiner*—Thomas M. Sember
*Attorney, Agent, or Firm*—Albert E. Chrow

[57] ABSTRACT

A vehicular headlight position adjusting assembly (100) is provided that has angularly oriented drive and driven gears (4) and (8) that upon rotation in opposite directions cause an elongate adjusting member (14) to traverse in opposite axial directions through a housing (7) where adjusting member (14) is prevented from rotating by cooperation between the side walls of at least one open-ended axial extending groove (26) adapted to receive at least one protrusion (34) that extends radially inwardly from the periphery of an opening (30) in housing (7) through which adjusting member (14) extends.

5 Claims, 2 Drawing Sheets

HEADLIGHT POSITION ADJUSTMENT ASSEMBLY

INTRODUCTION

This invention relates generally to an assembly for manually adjusting the position of a headlight, such as a vehicular headlight mounted on a movable frame, and more particularly to such assembly that includes a gear box assembly enclosed within a housing that is operative to cause an adjusting member operatively connected to the headlight frame to traverse without rotation in opposite axial directions and move the frame in response to rotation of an angularly oriented input drive member in opposite rotational directions.

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

Vehicular headlights have for many years been mounted on movable frames to enable periodic adjustment of their position, which is apt to change due to vibration and the like, so as to illuminate the road ahead in a suitable manner, preferably without focusing directly upon oncoming vehicles.

Although the headlight frame position has commonly been adjustable by means of straight screws threadingly engaged with a fixed frame and located so that, upon rotation, they operate to move the headlight and its frame upwardly and downwardly or to the right and left as required, lately, due to more complex designs and more difficult accessability, gear box assemblies have been employed that provide for a rotatable input drive member and an output adjusting screw that are angularly oriented with respect to each other, examples of which are disclosed in U.S. Pat. No. 4,665,469, assigned to the assignee of the present invention, and in U.S. Pat. Nos. 4,893,219; 5,165,775; 5,398,173 and 5,508,896, the disclosures of which are incorporated herein by reference.

In addition to the above, certain of the headlight position adjusting assemblies have been designed to prevent the output adjustment member from rotating while traversing in opposite axial directions in response to rotation of the input drive member in opposite directions, examples of which can be found in U.S. Pat. No. 4,796,494, assigned to the assignee of the present invention, and in U.S. Pat. Nos. 5,186,531; 5,309,780 and 5,351,170, the disclosures of which are incorporated herein by reference.

The present invention is of the latter type in being directed toward a headlight position adjusting assembly that employs a gear box between an input drive member and an angularly oriented output adjustment member, but rather than having both rotate, is uniquely designed such that rotation of the input drive member in opposite rotational directions is operative to traverse the output adjustment member in opposite axial directions without rotation by means contained within a housing protectively enclosing the gears.

BRIEF SUMMARY OF THE INVENTION

Accordingly, it is an object of this invention to provide a headlight position adjusting assembly having a rotatable input drive member drivingly connected to an output adjustment member in a manner that enables the adjustment member to traverse in opposite axial directions without rotation to adjust the position of the headlight.

It is another object of this invention to provide a headlight position adjusting assembly having a rotatable input drive member drivingly connected by means contained within a gear box housing in a manner operative to cause an output adjustment member to traverse in opposite axial directions without rotation to adjust the position of the headlight.

DETAILED DESCRIPTION OF THE INVENTION

Figure 1:
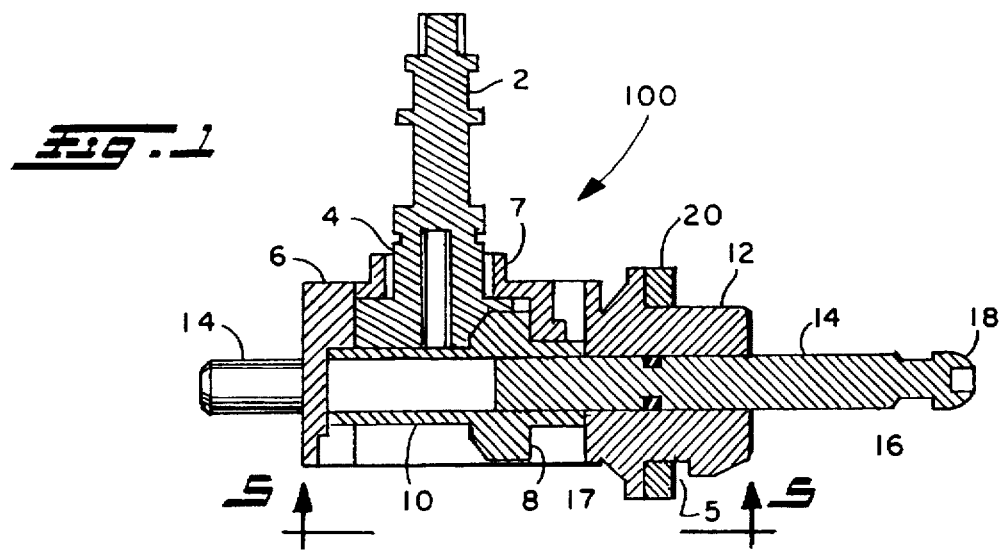
FIG. 1 is a central cross-section side elevation view of an embodiment of the adjusting assembly of the invention referenced by numeral 100.

In FIG. 1, assembly 100 comprises a drive member 2 that is preferably integral with drive gear 4 and operative to rotate gear 4 in unison therewith. Gear 4 has teeth (not referenced) that are meshingly engaged with the teeth of driven gear 8 that has an integral tubular section 10 and through both of which extends a bore (not referenced) whose surrounding surface is threaded.

Figure 7:
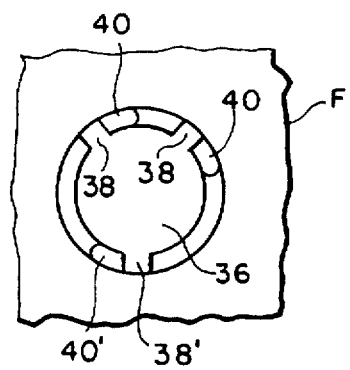
FIG. 7 is a front view of frame F of FIG. 2 showing opening 36 through which hub 12 of assembly 100 is received.

Drive gear 4 and driven gear 8 are in substantial transverse relationship to each other and both are mounted for rotation in housing 7. Housing 7 includes means at one end for securing assembly 100 to a fixed frame F in the form of a tubular hub 12 that is insertable through an opening 36 in frame F shown in FIG. 7. Hub 12 has a plurality of circumferentially spaced-apart lug-like protrusions 22 disposed outwardly of an annular slot 15 in hub 12 that are employed to register with and pass through corresponding radially outwardly extending slots 38 and 38' circumferentially spaced about the periphery of opening 36. Protrusions 22 and slots 38 need not all be of the same width as one or more of the protrusions may be of a different width such as referenced by numeral 22' that is operative to pass through slot 38' for orientation purposes. Once protrusions 22 and 22' have passed through slots 38 and 38' respectively, hub 12 is rotated so that the backs of protrusions 22 and 22' slide along corresponding ramps 40 and 40' to secure assembly 100 to fixed frame F.

A resilient O-ring is preferably disposed about hub 12 on the receiving side of frame F such that it is compressed when hub 12 of housing 7 is secured to frame F to provide a moisture and air seal therebetween.

Figure 2:
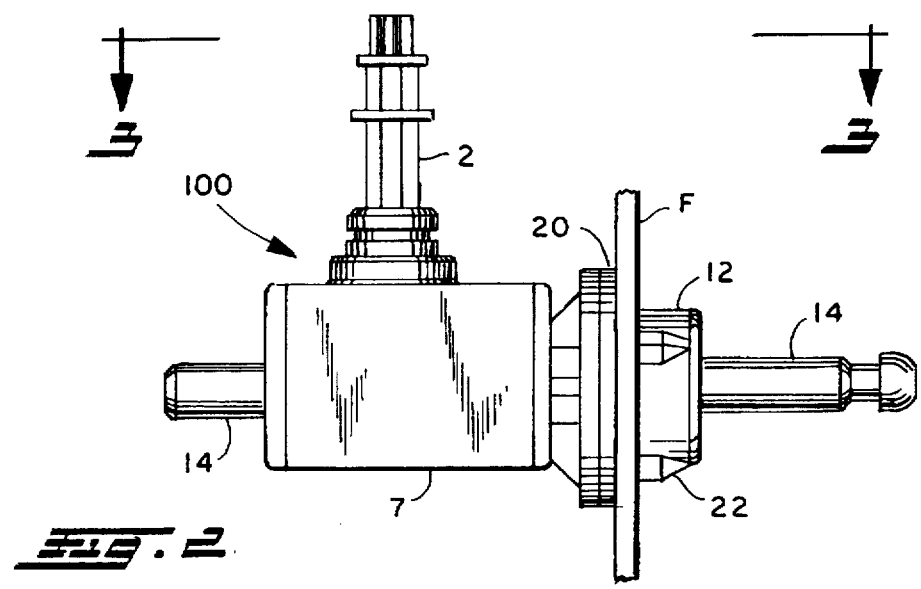
FIG. 2 is a side elevation view of adjusting assembly 100 contained within housing 6.
Figure 3:
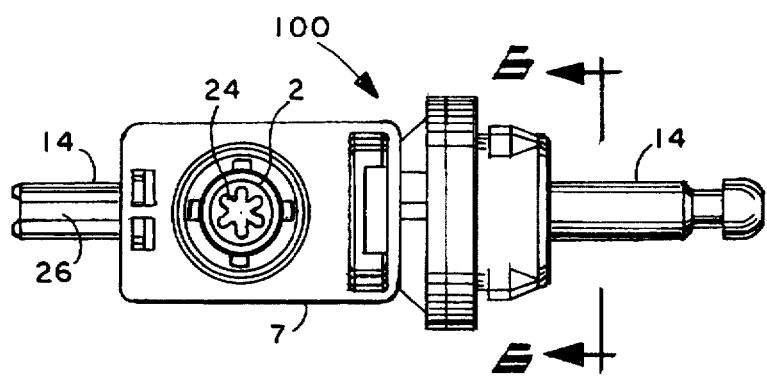
FIG. 3 is a top elevation view of adjusting assembly 100 taken along view line 3—3 in FIG. 2.

An elongated tubular adjusting member 14 extends through housing 7 including hub 12 and the bore within driven gear 8 and extension 10, as shown in FIGS. 1–3.

Adjusting member 14 has one end configured like a spherical ball referenced by numeral 18 that is adapted to engage a socket in the movable frame upon which the headlight is mounted to provide a pivotable ball-and-socket-type connection therebetween well known in the art.

Adjusting member 14 includes external threads 16 shown in FIG. 1 that are threadingly engaged with the internal threads in driven gear 8 and section 10 thereof.

Adjusting member 14 is thus disposed in angular relationship and preferably transverse relationship to drive member 2 such that rotation of drive member 2 in opposite directions causes drive gear 4 to rotate driven gear 8, which ordinarily would cause adjusting member 14 to rotate and traverse in opposite axial directions through housing 6.

Also shown in FIG. 3 is a six-lobed external protrusion 24 at the end of drive member 2 that is adapted to interfere with a six-lobed socket tool as one means by which to enhance rotation of drive member 2.

Figure 4:
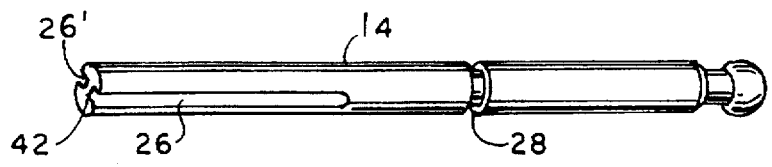
FIG. 4 is a perspective view of adjusting member 14 of adjusting assembly 100.

For simplicity, external threads 16 of adjusting member 14 are not shown except for in FIG. 1. FIG. 4, shows that adjusting member 14 preferably includes a transverse annular groove 28 thereabout for containing a resilient sealing member such as an O-ring referenced by numeral 17 in FIG. 1 that provides a seal as adjusting member 14 traverses in opposite axial directions without rotation through hub 12 of housing 7.

In many instances, it is desirable that the adjusting member transverse in opposite axial directions without rotation. Means for preventing rotation of adjusting member 14 are shown in FIGS. 3, 4, 5, 8 and 9 of which the preferred means is shown in FIGS. 4 and 5 where in FIG. 4 adjusting member 14 is provided with at least one axially extending open-ended groove of predetermined length referenced by numeral 26 and preferably a pair of diametrically opposed axially extending open-ended grooves 26 and 26' separated by a web referenced by numeral 42 in FIG. 4.

Figure 5:
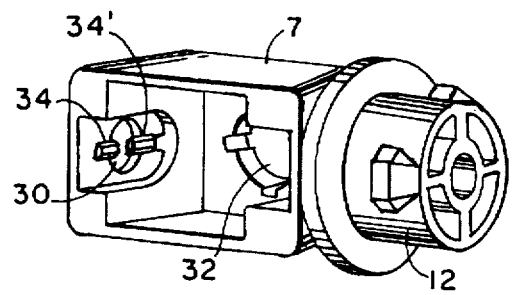
FIG. 5 is a perspective view of housing 6 of adjusting assembly 100 as taken along view line 5—5 in FIG. 1.
Figure 6:
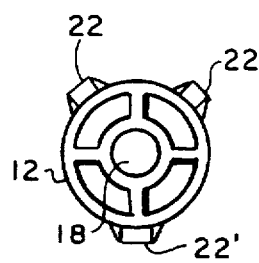
FIG. 6 is an end view of hub 12 of assembly 100 taken along view line 6—6 in FIG. 3.

As shown in FIG. 5, housing 7 includes a protrusion 34 that extends radially inwardly from the periphery of opening 30. Protrusion 34 is adapted to be received into groove 26 and cooperate therewith by engaging the sidewalls thereof to prevent adjusting member 14 from rotating as groove 26 moves in opposite axial directions relative protrusion 34 for the predetermined axial length thereof which will be generally the same as the distance that frame F is desired to be moved by adjusting member 14.

Housing 7 more preferably includes a protrusion 34' diametrically opposed to protrusion 34 that extends from the opposite side of opening 30 and is operative to be received into groove 26' and cooperate therewith to prevent rotation of adjusting member 14. Although it is preferred the embodiments of the invention that feature more than one axially extending open-ended groove that the grooves be diagonally opposed, they are not required to be and may, for example, comprise two or more grooves that are positioned in circumferential spaced-apart relationship to each other with opening 30 including corresponding protrusions for registration therewith.

Figure 8:
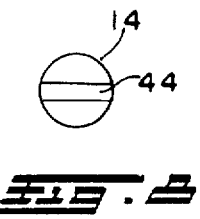
FIG. 8 is a left end view of adjustment member 14 shown in FIGS. 1-4.
Figure 9:
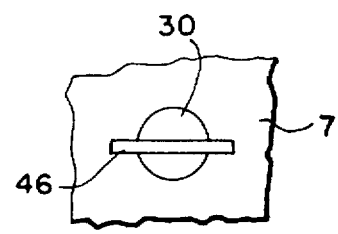
FIG. 9 is a left end view of a portion of housing 7 of assembly 100 showing opening 30 during which a portion of adjusting member 14 is received.

In yet another embodiment of the invention shown in FIGS. 8 and 9, web 42 has been omitted to provide an open-ended slot 44 shown in FIG. 8 that extends axially along adjusting member 14 for the predetermined length into which a bar 46 of housing 7 extending across opening 30 shown in FIG. 9 is operative to be received and cooperate therewith by engaging the side walls of slot 44 to prevent adjusting member 14 from rotating as it traverses in opposite axial directions in response to rotation of drive member 2 in opposite rotational directions.

We claim:

1. A vehicular headlight position adjusting assembly comprising:

intermeshed drive and driven gears having respective rotational axis disposed in angular relationship to each other, a drive member operable upon rotation to cause both the drive gear and the driven gear to rotate about their respective rotational axis, an elongate adjusting member threadingly engaged with the driven gear and having an end thereof adapted to engage a movable frame upon which a headlight is mounted, a housing adapted to protectively enclose the drive and driven gears and having respective openings therein enabling opposite ends of the adjusting member to extend therethrough, means for securing the housing to a fixed frame on a vehicle so as to enable the adjusting member to move the movable frame in response to rotation of the drive member, and means for preventing the adjusting member from rotating whilst enabling the adjusting member to traverse in opposite axial directions in response to rotation of the drive member in opposite rotational directions, said means comprising at least one protrusion extending radially inwardly from a periphery of one of the housing openings through which one of the opposite ends of the adjusting member extends, and at least one elongate open-ended groove extending from the opposite end of the adjusting member for a predetermined axial length therealong, said groove adapted to receive the protrusion therein and to cooperate therewith to provide the means for preventing rotation of the adjusting member.

2. The assembly of claim 1 wherein the means for securing the housing to a fixed frame is provided by said housing opening including at least one slot extending radially outwardly from the periphery thereof and said housing including a hub adapted to be received through the opening and having at least one protrusion extending radially outwardly therefrom that is operative to be received through the slot and secure the housing to the frame upon rotation of the housing relative the frame.

3. The assembly of claim 1 wherein the adjusting member includes two of the grooves in spaced-apart circumferential relationship to each other and the housing opening includes two of the protrusions respectively adapted for registration therewith.

4. The assembly of claim 3 wherein the grooves and protrusions are diametrically opposed to each other.

5. The assembly of claim 1 wherein the groove extends through the adjusting member to provide an open-ended slot extending axially therealong and the protrusion extends across the housing opening to provide a bar thereacross that is operative to be received in the slot and cooperate therewith to prevent rotation of the adjusting member.

* * * * *